US012086067B2

(12) United States Patent
Waterman et al.

(10) Patent No.: US 12,086,067 B2
(45) Date of Patent: Sep. 10, 2024

(54) LOAD-STORE PIPELINE SELECTION FOR VECTORS

(71) Applicant: SiFive, Inc., San Mateo, CA (US)

(72) Inventors: Andrew Waterman, Berkeley, CA (US); Krste Asanovic, Oakland, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/141,463

(22) Filed: Apr. 30, 2023

(65) Prior Publication Data

US 2023/0367715 A1 Nov. 16, 2023

Related U.S. Application Data

(60) Provisional application No. 63/341,051, filed on May 12, 2022.

(51) Int. Cl.

*G06F 12/0855* (2016.01)
*G06F 12/0815* (2016.01)
*G06F 12/0875* (2016.01)
*G06F 12/0897* (2016.01)

(52) U.S. Cl.

CPC ...... *G06F 12/0855* (2013.01); *G06F 12/0815* (2013.01); *G06F 12/0875* (2013.01); *G06F 12/0897* (2013.01)

(58) Field of Classification Search

None

See application file for complete search history.

(56) References Cited

U.S. PATENT DOCUMENTS

2006/0236033 A1* 10/2006 Guinn ................ G06F 12/0871 711/E12.019
2013/0262780 A1* 10/2013 Manne ............... G06F 12/0888 711/E12.04

* cited by examiner

*Primary Examiner* — Charles J Choi

(74) *Attorney, Agent, or Firm* — Kilpatrick Townsend & Stockton LLP

(57) ABSTRACT

Systems and methods are disclosed for load-store pipeline selection for vectors. For example, an integrated circuit (e.g., a processor) for executing instructions includes an L1 cache that provides an interface to a memory system; an L2 cache connected to the L1 cache that implements a cache coherency protocol with the L1 cache; a first store unit configured to write data to the memory system via the L1 cache; a second store unit configured to bypass the L1 cache and write data to the memory system via the L2 cache; and a store pipeline selection circuitry configured to: identify an address associated with a first beat of a store instruction with a vector argument; select between the first store unit and the second store unit based on the address associated with the first beat of the store instruction; and dispatch the store instruction to the selected store unit.

22 Claims, 10 Drawing Sheets

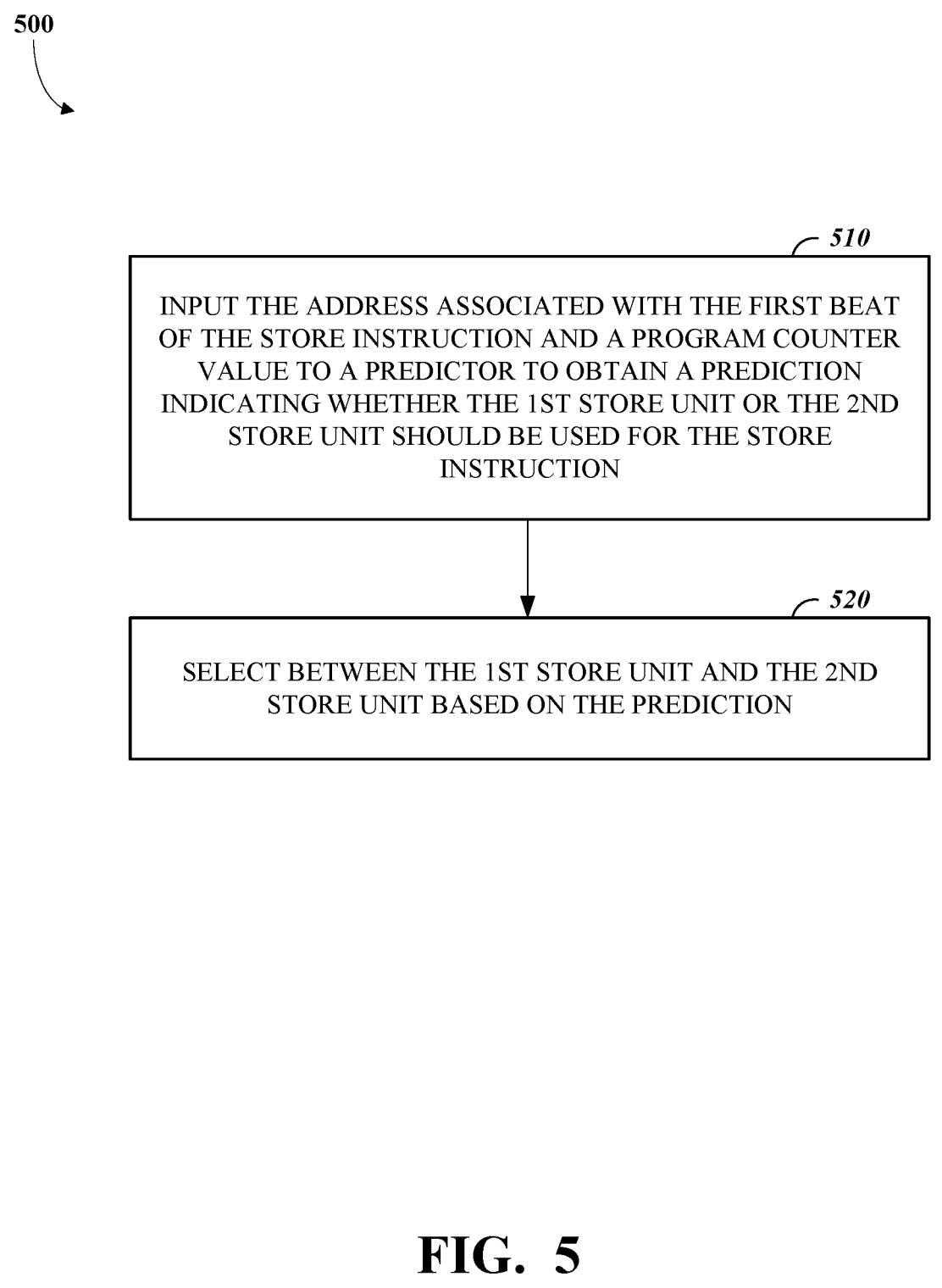

500

510

INPUT THE ADDRESS ASSOCIATED WITH THE FIRST BEAT OF THE STORE INSTRUCTION AND A PROGRAM COUNTER VALUE TO A PREDICTOR TO OBTAIN A PREDICTION INDICATING WHETHER THE 1ST STORE UNIT OR THE 2ND STORE UNIT SHOULD BE USED FOR THE STORE INSTRUCTION

520

SELECT BETWEEN THE 1ST STORE UNIT AND THE 2ND STORE UNIT BASED ON THE PREDICTION

FIG. 5

LOAD-STORE PIPELINE SELECTION FOR VECTORS

CROSS-REFERENCE TO RELATED APPLICATION(S)

This application claims priority to and the benefit of U.S. Provisional Patent Application Ser. No. 63/341,051, filed May 12, 2022, the entire disclosure of which is hereby incorporated by reference.

TECHNICAL FIELD

This disclosure relates to load-store pipeline selection for vectors.

BACKGROUND

Processors may be configured to execute vector instructions that operate on arguments that are longer than the number bits that can be written to a memory system in a single clock cycle. A store instruction for a vector may be executed by a store unit or pipeline in a series of beats over multiple clock cycles.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is a flow chart of an example of a technique for selecting a load-store pipeline using a predictor.

DETAILED DESCRIPTION

Overview

Figure 1:
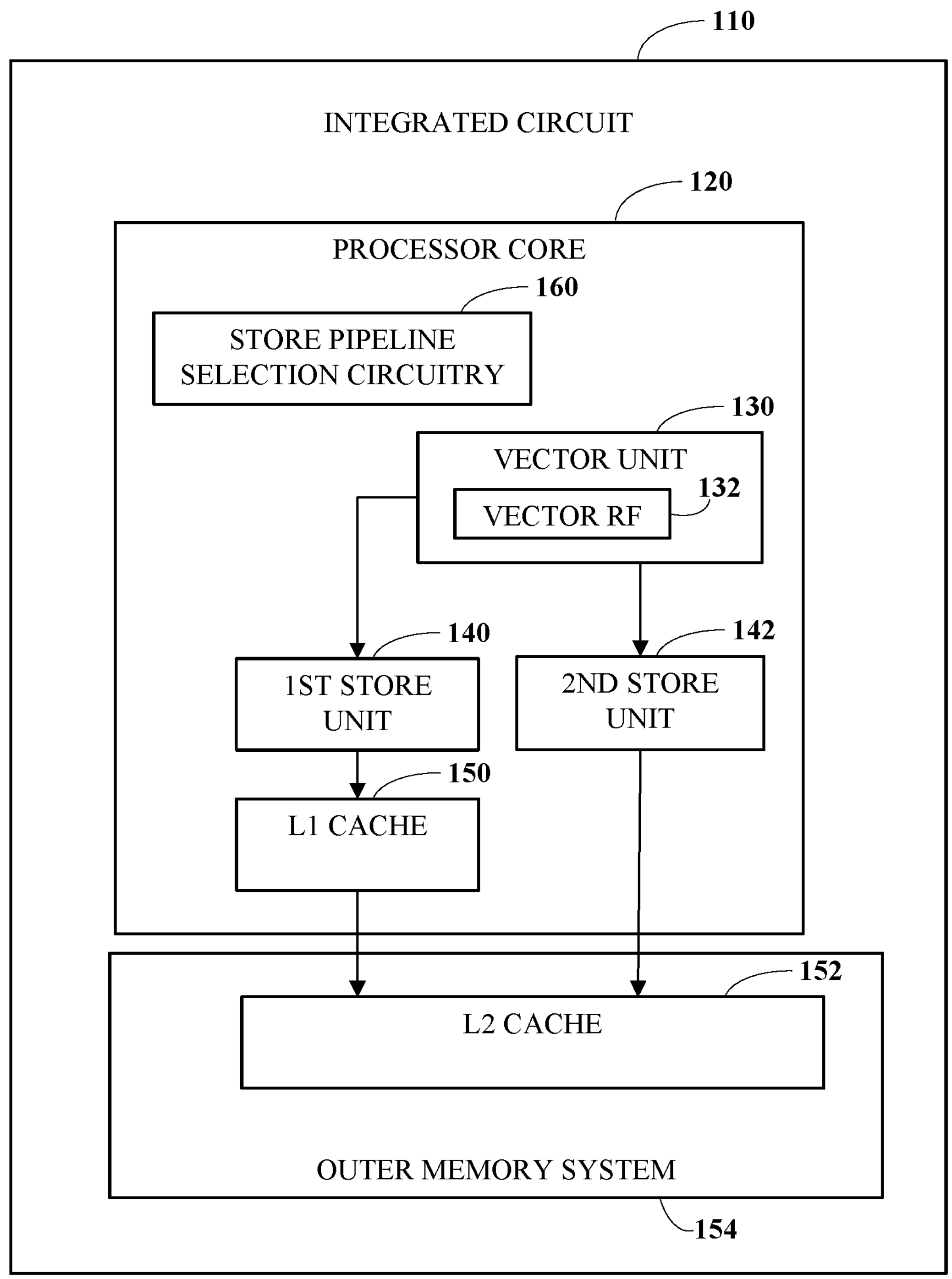
FIG. 1 is a block diagram of an example of an integrated circuit for executing instructions with load-store pipeline selection for vectors.

Disclosed herein are implementations of load-store pipeline selection for vectors. Some implementations may be used to increase memory bandwidth from a processor core in a processor (e.g., CPUs such as x86, ARM, and/or RISC-V CPUs) more efficiently than previously known solutions.

A processor core configured to execute vector instructions (e.g., using a vector unit with a vector register file) may include multiple store units (e.g., load/store pipelines) configured to execute store instructions in parallel to increase the memory bandwidth of the processor core. A first store unit of the processor core may access a memory system through an L1 cache (e.g., an L1 data cache), while a second store unit of the processor core may bypass the L1 cache. For example, the second store unit may access the memory system via an L2 cache that implements a cache coherency protocol with the L1 cache. Bypassing the L1 cache can increase the bandwidth available between the processor core and a memory system, but may incur performance penalties by causing cache invalidation events in the L1 data cache, where a bypassed write inadvertently renders an entry in the L1 cache stale.

Which of the store units is used to execute a given store instruction may be determined dynamically in an attempt to improve performance. A store instruction for a vector may use various addressing modes, including strided addressing or indexed addressing. At dispatch time for a store instruction, it may be that not all addresses associated with the write instruction have been resolved. In some implementations, an address associated with a first beat of a store instruction is identified and used to select which store unit will be used for the store instruction. For example, the associated address may be a target address of an element to be stored during the first beat of the store instruction. This associated address may provide a reasonable indication of the range of addresses that are expected to be associated with the store instruction.

For example, the address associated with the first beat may be used to check the L1 cache for tags matching the associated address. If a matching tag is found in the L1 cache, then the first store unit may be used to execute the store instruction. If a matching tag is not found in the L1 cache, then the second store unit may be used to execute the store instruction and the L1 cache may be bypassed.

In some implementations, a predictor is used to select between the first store unit and the second store unit. Various techniques for prediction may be used, such as maintaining predictor entries with a saturating counter that is updated when a corresponding write instruction causes a cache invalidation or executes without causing a cache invalidation. For example, the prediction entries may be indexed by hash of a program counter value and a target address of the store instruction.

It may be advantageous to force writes to memory mapped input/output (MMIO) to pass through the L1 cache. In some implementations, the address associated with the first beat of the store instruction is checked to determine whether it corresponds to MMIO. If it does correspond to MMIO, then the write instruction is dispatched to the first store unit.

Dependencies between instructions may complicate the use of two store units in parallel. It may cause an error for a store instruction to execute at an address before an earlier instruction in program order that targets the same address is executed. For example, there could be write after write (WAW) hazards or write after read (WAR) hazards. If a write instruction is dispatched to a different store unit than a unit that is executing an instruction that is earlier in program order and shares a target address with the later write instruction, then there is a risk that the later write instruction will be executed before the earlier instruction. One solution to prevent this problem is to detect dependencies and force the later write instruction to be dispatched to the same unit as the earlier instruction so that the later instruction is executed after the earlier instruction in a first-in-first-out (FIFO) queue. Another solution to prevent this problem is to detect dependencies and delay dispatch of the later write instruction until the earlier instruction finishes executing and then chose the execution unit for the later write instruction based on other criteria.

Implementations, described herein may provide advantages over conventional processors, such as, for example, increasing the memory bandwidth of a processor core while reducing the chance of cache invalidation events and/or improving performance of the processor core.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

As used herein, the term "microarchitectural state" refers to a portion of the state (e.g., bits of data) of an integrated circuit (e.g., a processor or microcontroller) that is not directly accessible by software executed by the integrated circuit. For example, a microarchitectural state may include data stored in a cache and/or data stored by control-flow predictor that is used to make predictions about control-flow execution.

Details

FIG. 1 is a block diagram of an example of an integrated circuit 110 for executing instructions with load-store pipeline selection for vectors. For example, the integrated circuit 110 may be a processor, a microprocessor, a microcontroller, or an IP core. The integrated circuit 110 includes a processor core 120 configured to execute vector instructions that operate on vector arguments. In this example, the processor core 120 includes a vector unit 130 with a vector register file 132 that is configured execute vector instructions that operate on vector arguments. In some implementations, the processor core 120 may also include a scalar unit for executing scalar instructions and a shared processor pipeline with stages for instruction fetch, decode, and dispatch (not shown in FIG. 1). The integrated circuit 110 includes an L1 cache 150 that provides an interface to a memory system of the integrated circuit 110. The integrated circuit 110 includes an L2 cache 152 connected to the L1 cache 150 that implements a cache coherency protocol with the L1 cache 150. In this example, the L1 cache 150 is part of the processor core 120 and the L2 cache 152 is outside of the processor core 120 and part of an outer memory system 154 of the integrated circuit 110. In some implementations (not shown in FIG. 1), the L2 cache 152 may be part of the processor core 120. The processor core 120 includes a first store unit 140 that is configured to execute memory access instructions (e.g., store and/or load instructions). The first store unit 140 is configured to write data to the memory system via the L1 cache 150. The processor core 120 includes a second store unit 142 configured to bypass the L1 cache 150 and write data to the memory system via the L2 cache 152. The first store unit 140 and the second store unit 142 may provide alternative data paths between the vector unit 130 and the outer memory system 154 that can be used in parallel to increase the throughput for writing data to memory. The processor core 120 includes a store pipeline selection circuitry 160 configured to select between the first store unit 140 and the second store unit 142 for vector store instructions and dispatch those vector store instructions to the selected store unit for execution. For example, the integrated circuit 110 may be used to implement the technique 300 of FIG. 3. For example, the integrated circuit 110 may be used to implement the technique 400 of FIG. 4. For example, the integrated circuit 110 may be used to implement the technique 500 of FIG. 5. For example, the integrated circuit 110 may be used to implement the technique 600 of FIG. 6. For example, the integrated circuit 110 may be used to implement the technique 700 of FIG. 7. For example, the integrated circuit 110 may be used to implement the technique 800 of FIG. 8.

The integrated circuit 110 includes a first store unit 140 configured to write data to the memory system via the L1 cache 150, and a second store unit 142 configured to bypass the L1 cache 150 and write data to the memory system via the L2 cache 152. In some implementations, the first store unit 140 is a load/store pipeline and the second store unit 142 is a store-only pipeline. For example, the L1 cache 150 may be an L1 data cache.

The integrated circuit 110 includes a store pipeline selection circuitry 160. For example, the store pipeline selection circuitry 160 may be part of a dispatch stage of a processor pipeline that is shared between the vector unit 130 and a scalar unit (not shown in FIG. 1). The store pipeline selection circuitry 160 may be configured to identify an address associated with a first beat of a store instruction with a vector argument. For example, the store instruction may be strided or indexed. The store instruction may be serialized and executed in multiple beats over multiple clock cycles. In some implementations, the address associated with the first beat of the store instruction may be a destination address for an element of a vector that will be stored during a first beat of the store instruction. The store pipeline selection circuitry 160 may be configured to select between the first store unit 140 and the second store unit 142 based on the address associated with the first beat of the store instruction. For example, the store pipeline selection circuitry 160 may be configured to search the L1 cache 150 for a tag matching the address associated with the first beat of the store instruction. If a matching tag is found, then the store pipeline selection circuitry 160 may, responsive to finding a matching tag in the L1 cache 150, select the first store unit 140. If a matching tag is not found, then the store pipeline selection circuitry 160 may, responsive to not finding a matching tag in the L1 cache 150, select the second store unit 142. Such a policy may reduce the chance of precipitating a cache coherence event (e.g., a cache invalidation) when using the second store unit 142 to bypass the L1 cache 150. The store pipeline selection circuitry 160 may be configured to dispatch the store instruction to the selected store unit (i.e., the first store unit 140 or the second store unit 142).

For example, the store pipeline selection circuitry 160 may detect dependency between store instructions (e.g., write after write hazards) and select between the first store unit 140 and the second store unit 142 based on a detected dependency. In some implementations, the store instruction may be a first store instruction and the store pipeline selection circuitry 160 may be configured to check the selected store unit for an instruction with a target address matching a target address of a second store instruction, and, responsive to a target address for the first store instruction being executed by the selected store unit matching the target address of the second store instruction, dispatch the second store instruction to the selected store unit (i.e., the first store unit 140 or the second store unit 142). In some implementations, the store pipeline selection circuitry 160 may be configured to check the selected store unit for an instruction with a target address matching a target address of a second store instruction, and, responsive to a target address for the first store instruction being executed by the selected store unit matching the target address of the second store instruction, delay dispatch of the second store instruction until after execution of the first store instruction is completed.

Figure 2:
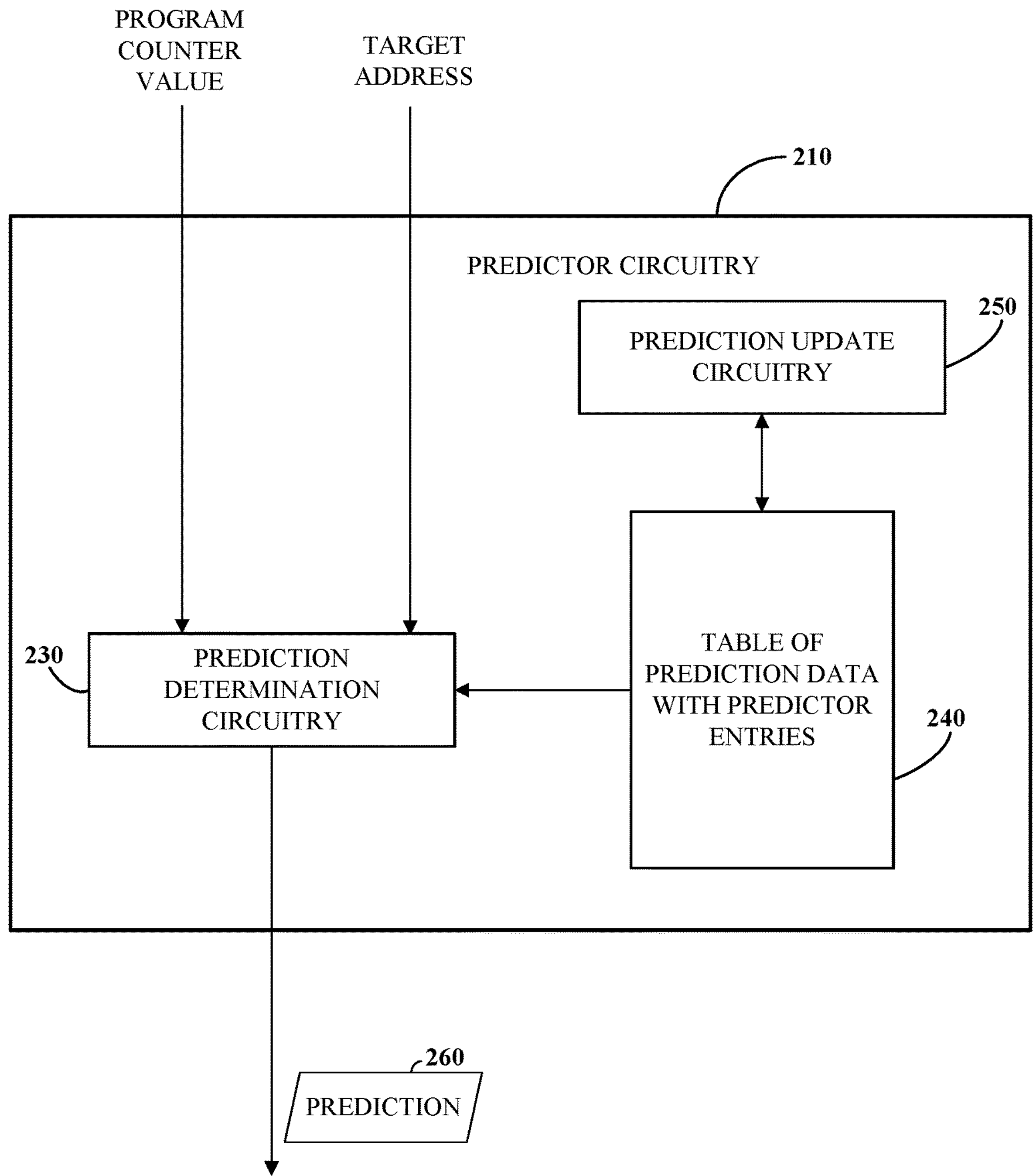
FIG. 2 is a block diagram of an example of a predictor circuitry for load-store pipeline selection for vectors.

In some implementations, the store pipeline selection circuitry 160 includes a predictor (e.g., the predictor circuitry 210 of FIG. 2). The store pipeline selection circuitry 160 may be configured to input the address associated with the first beat of the store instruction and a program counter value to the predictor to obtain a prediction indicating whether the first store unit 140 or the second store unit 142 should be used for the store instruction. The store pipeline selection circuitry 160 may be configured to select between the first store unit 140 and the second store unit 142 based on the prediction. For example, the predictor may store entries that are indexed by a hash of a program counter value and a target address. For example, an entry of the predictor may be updated based on a cache invalidation event of the cache coherency protocol that invalidates an entry of the L1 cache 150 responsive to execution of an instruction by the second store unit 142. For example, an entry of the predictor may store a counter that is updated when the store instruction is retired.

FIG. 2 is a block diagram of an example of a predictor circuitry 210 for load-store pipeline selection for vectors. The predictor circuitry 210 includes a prediction determination circuitry 230 that takes a program counter value and a target address as inputs and outputs a resulting prediction 260 that indicates whether a first store unit or a second store unit is likely to be better for corresponding store instruction. The predictor circuitry 210 includes a table of prediction data with predictor entries 240. The prediction determination circuitry 230 may read an entry from the table of prediction data with predictor entries 240 and use the returned data to generate the prediction 260. For example, the table of prediction data with predictor entries 240 may be stored in SRAM or some other data storage circuitry. In some implementations, the entries 240 are indexed by a hash of a program counter value and a target address. For example, prediction data stored in an entry of the table of prediction data 240 may be indicative of a likelihood that executing a corresponding store instruction with the second store unit 142 to bypass the L1 cache 150 results in a cache invalidation. For example, the predictor circuitry 210 may be used in implementing the technique 500 of FIG. 5.

The predictor circuitry 210 includes a prediction update circuitry 250. For example, the prediction update circuitry 250 may be configured to update an entry of the predictor based on a cache invalidation event of the cache coherency protocol that invalidates an entry of the L1 cache 150 responsive to execution of an instruction by the second store unit 142. In some implementations, an entry of the table of prediction data 240 stores a counter (e.g., a two-bit saturating counter) that is updated when the store instruction is retired. For example, a counter in an entry of the table of prediction data 240 may be decremented when a cache invalidation event occurs and may be incremented when a store instruction is retired without triggering a cache invalidation event.

Figure 3:
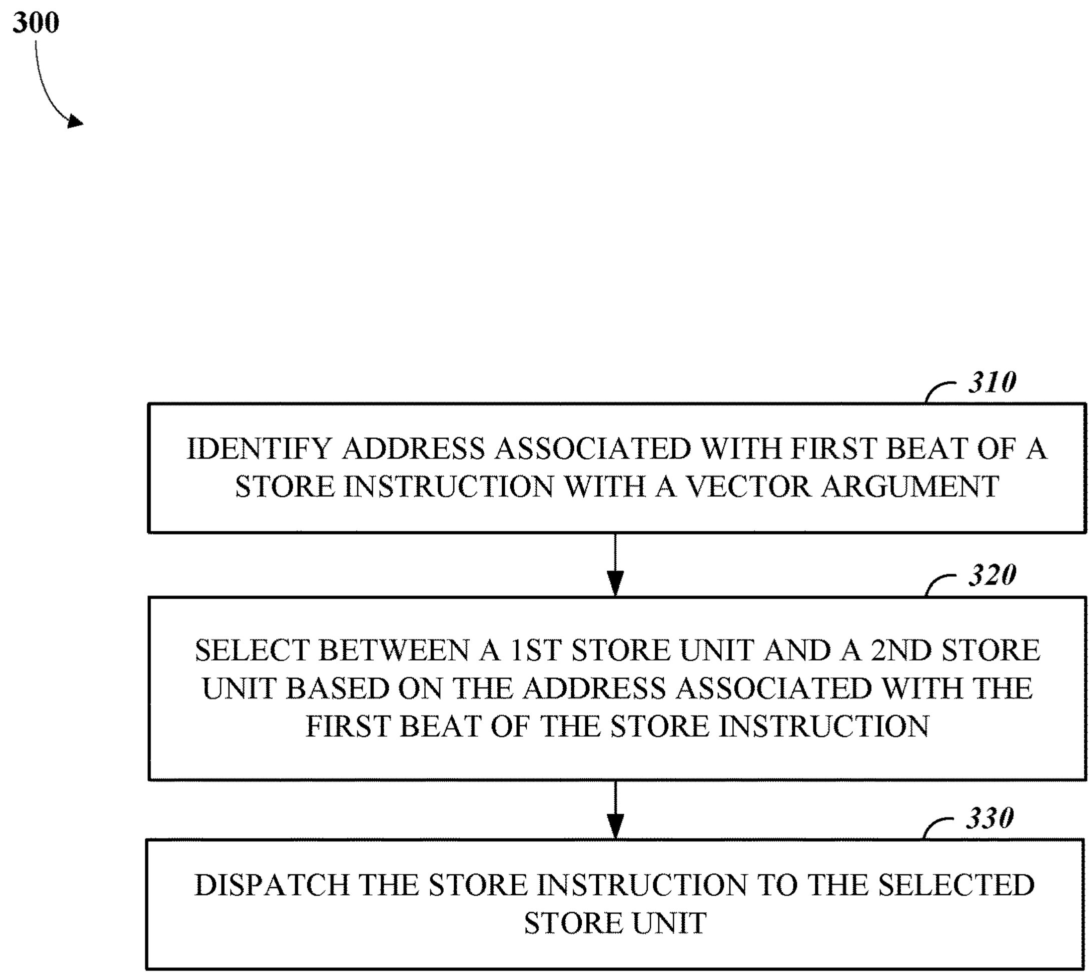
FIG. 3 is a flow chart of an example of a technique for executing instructions with load-store pipeline selection for vectors.

FIG. 3 is a flow chart of an example of a technique 300 for executing instructions with load-store pipeline selection for vectors. The technique 300 includes identifying 310 an address associated with a first beat of a store instruction with a vector argument; selecting 320 between a first store unit and a second store unit based on the address associated with the first beat of the store instruction, wherein the first store unit interfaces to a memory system through an L1 cache and the second store unit bypasses the L1 cache when accessing the memory system; and dispatching 330 the store instruction to the selected store unit. For example, the technique 300 may be implemented using the integrated circuit 110 of FIG. 1. For example, the technique 300 may be implemented using the predictor circuitry 210 of FIG. 2.

The technique 300 includes identifying 310 an address associated with a first beat of a store instruction with a vector argument. For example, the store instruction may be strided or indexed (e.g., a scatter instruction). The store instruction may be serialized and executed in multiple beats over multiple clock cycles. For example, the number of beats used to execute a store instruction may depend on a size of the vector, an element size for the vector, and a data path width. In some implementations, the address associated with the first beat of the store instruction may be a destination address for an element of a vector that will be stored during a first beat of the store instruction. Although not guaranteed for all types of store instructions, an address associated with the first beat may be similar to corresponding addresses for subsequent beats of the store instruction.

The technique 300 includes selecting 320 between a first store unit (e.g., the first store unit 140) and a second store unit (e.g., the second store unit 142) based on the address associated with the first beat of the store instruction, wherein the first store unit interfaces to a memory system through an L1 cache and the second store unit bypasses the L1 cache when accessing the memory system. For example, the first store unit may be a load/store pipeline and the second store unit may be a store-only pipeline. In some implementations, a store unit may be selected 320 based on checking whether the address associated with the first beat of the store instruction matches a tag in the L1 cache. For example, the technique 400 of FIG. 4 may be implemented to select 320 between the first store unit and the second store unit. In some implementations, a store unit may be selected 320 based on a prediction from a predictor. For example, the technique 500 of FIG. 5 may be implemented to select 320 between the first store unit and the second store unit. In some implementations, a store unit may be selected 320 based on a whether the address associated with the first beat of the of the store instruction corresponds to memory mapped input/output. For example, the technique 600 of FIG. 6 may be implemented to select 320 between the first store unit and the second store unit. In some implementations, a store unit may be selected 320 based on detected a dependency (e.g., a write after write hazard) between store instructions. For example, the technique 700 of FIG. 7 may be implemented to select 320 between the first store unit and the second store unit. In some implementations, on a sequence of prioritized checks. For example, first dependencies can be checked and if a dependency is detected, then the dependency can determine which store unit is selected 320. If no dependency is detected, then an address type can be checked to determine if the address corresponds to memory mapped input/output, and, if the address corresponds to memory mapped input/output, then the store unit may be selected 320 based on the address type. If the address type is not memory mapped input/output, then the L1 cache may be checked for a match to the address associated with the first beat of the of the store instruction, and the store unit may be selected 320 based on whether there is a match in the L1 cache.

The technique 300 includes dispatching 330 the store instruction to the selected store unit. In some implementations, the timing of the dispatch is changed to avoid dependency hazards that could be caused by using multiple store units in parallel. For example, the technique 800 of FIG. 8 may be implemented to delay dispatching 330 the store instruction to the selected store unit while an earlier store instruction causing a write after write hazard is executing in one of the parallel store units.

Figure 4:
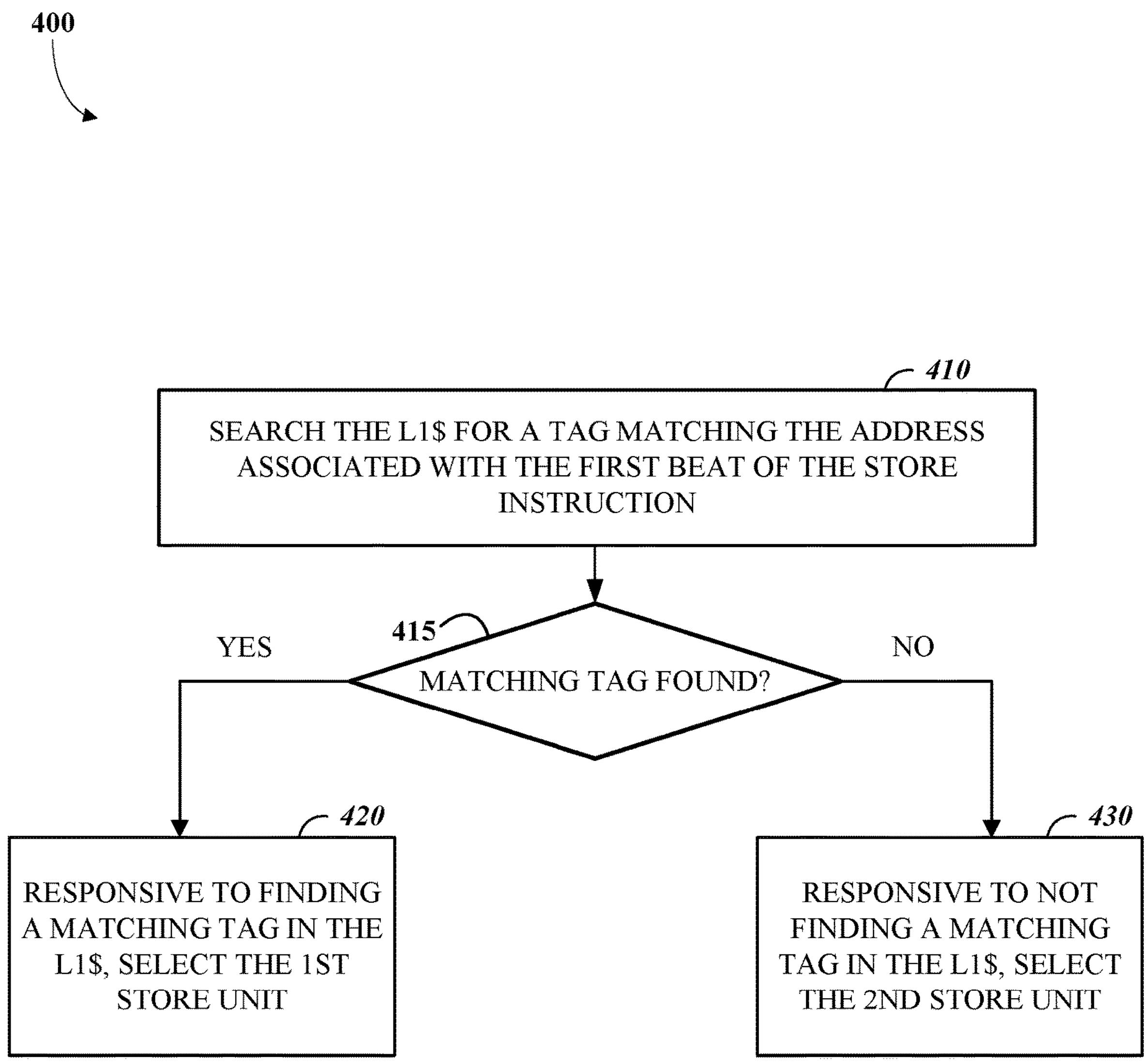
FIG. 4 is a flow chart of an example of a technique for selecting a load-store pipeline by checking an inner cache for tags matching an address associated with a first beat of a vector instruction.

FIG. 4 is a flow chart of an example of a technique 400 for selecting a load-store pipeline by checking an inner cache for tags matching an address associated with a first beat of a vector instruction. The technique 400 includes searching 410 the L1 cache for a tag matching the address associated with the first beat of the store instruction. At 415, if a matching tag is found, then the technique 400 includes, responsive to finding a matching tag in the L1 cache, selecting 420 the first store unit (e.g., the first store unit 140). At 415, if a matching tag is not found, then the technique 400 includes, responsive to not finding a matching tag in the L1 cache, selecting 430 the second store unit (e.g., the second store unit 142). The technique 400 may reduce the chance of precipitating a cache coherence event (e.g., a cache invalidation) when using the second store unit to bypass the L1 cache. For example, the technique 400 may be implemented using the integrated circuit 110 of FIG. 1.

FIG. 5 is a flow chart of an example of a technique 500 for selecting a load-store pipeline using a predictor. The technique 500 includes inputting 510 the address associated with the first beat of the store instruction and a program counter value to a predictor to obtain a prediction indicating whether the first store unit or the second store unit should be used for the store instruction; and selecting 520 between the first store unit and the second store unit based on the prediction. For example, the technique 500 may be implemented using the integrated circuit 110 of FIG. 1. For example, the technique 500 may be implemented using the predictor circuitry 210 of FIG. 2.

The technique 500 includes inputting 510 the address associated with the first beat of the store instruction and a program counter value to a predictor (e.g., the predictor circuitry 210) to obtain a prediction indicating whether the first store unit or the second store unit should be used for the store instruction. For example, the address associated with the first beat of the instruction may be a target address fir an element of a vector that will be stored in during the first beat. For example, the predictor may store entries that are indexed by a hash of a program counter value and a target address. In some implementations, an entry of the predictor may store a counter (e.g., a two-bit saturation counter), which may be updated based on whether a store instruction associated with the entry causes a cache invalidation to occur. For example, an entry of the predictor is updated (e.g., decremented) based on a cache invalidation event of a cache coherency protocol that invalidates an entry of the L1 cache responsive to execution of an instruction by the second store unit. For example, an entry of the predictor may store a counter that is updated (e.g., incremented) when the store instruction is retired. In some implementations, a default prediction (e.g., indicating that the second store unit should be selected) is returned if there is no matching entry for the store instruction in the predictor state.

The technique 500 includes selecting 520 between the first store unit and the second store unit based on the prediction. For example, the prediction output by the predictor may be a binary flag identifying which store unit should be selected 520. In another example, the prediction output by the predictor may be a value of a counter stored in an entry of the predictor, which may be indicative of the likelihood that bypassing the L1 cache for the store instruction will cause a cache invalidation event. In some implementations, the first store unit is selected 520 if a counter value stored in a corresponding entry of the predictor is below a threshold, and the second store unit is selected 520 if the counter value stored in the corresponding entry of the predictor is above the threshold.

Figure 6:
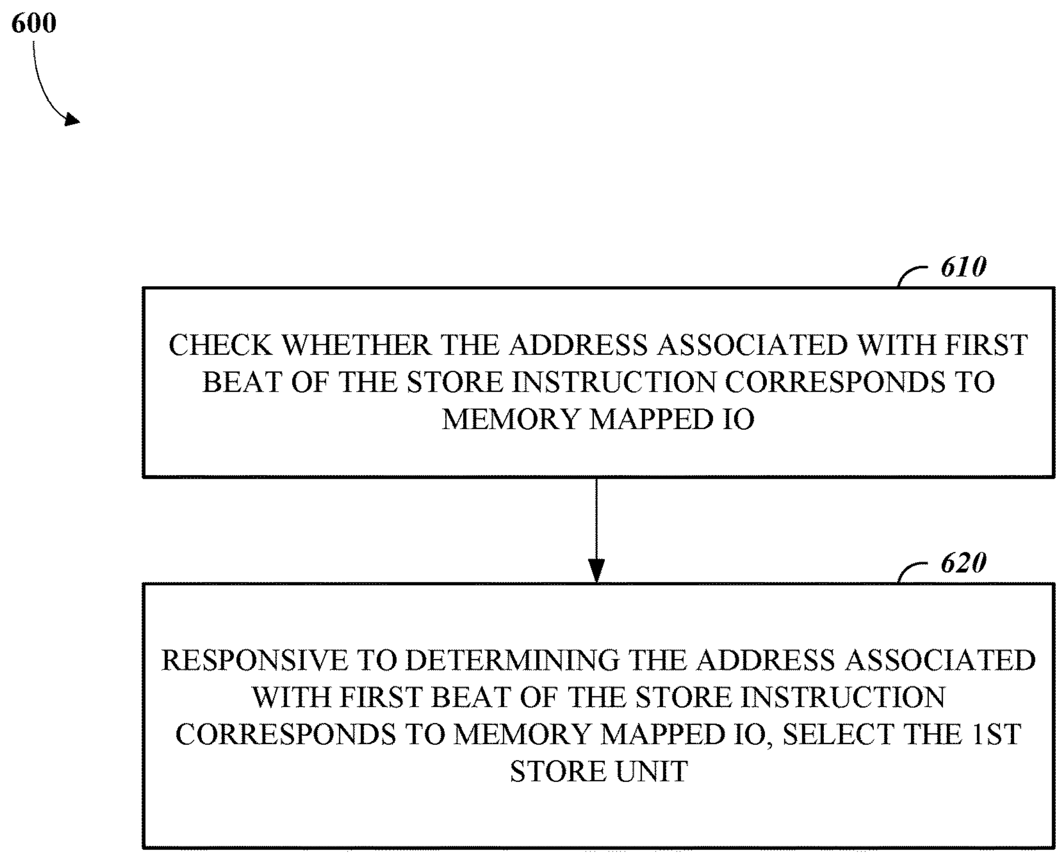
FIG. 6 is a flow chart of an example of a technique for selecting a load-store pipeline based on whether an address is mapped to input/output.

FIG. 6 is a flow chart of an example of a technique 600 for selecting a load-store pipeline based on whether an address is mapped to input/output. It may be advantageous to route writes to memory mapped input/output through the L1 cache (e.g., the L1 cache 150). The technique 600 includes checking 610 whether the address associated with the first beat of the store instruction corresponds to memory mapped input/output; and, responsive to determining the address associated with the first beat of the store instruction corresponds to memory mapped input/output, selecting 620 the first store unit. For example, some address ranges in a memory system (e.g., the outer memory system 154) may be associated with memory mapped input/output (e.g., an address for a serial port). For example, the technique 600 may be implemented using the integrated circuit 110 of FIG. 1.

Figure 7:
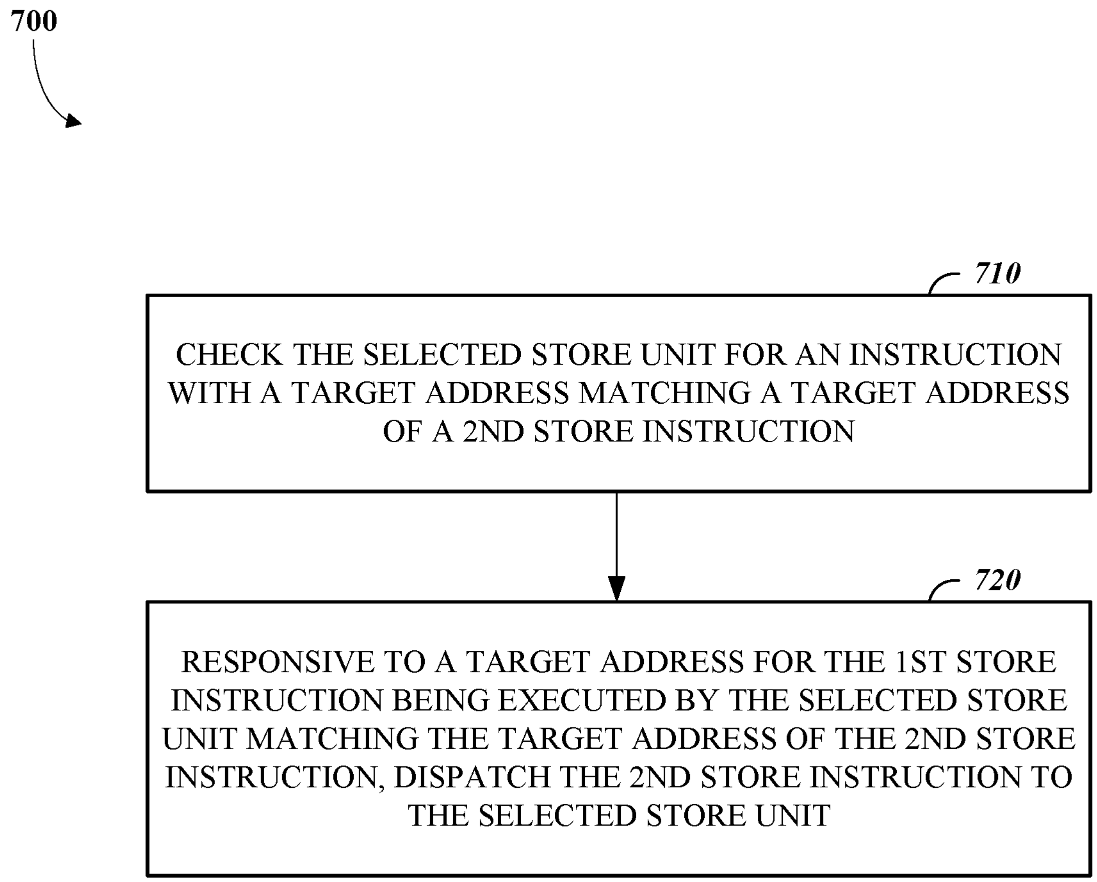
FIG. 7 is a flow chart of an example of a technique for selecting a load-store pipeline based on a matching target address in a load-store pipeline.
Figure 8:
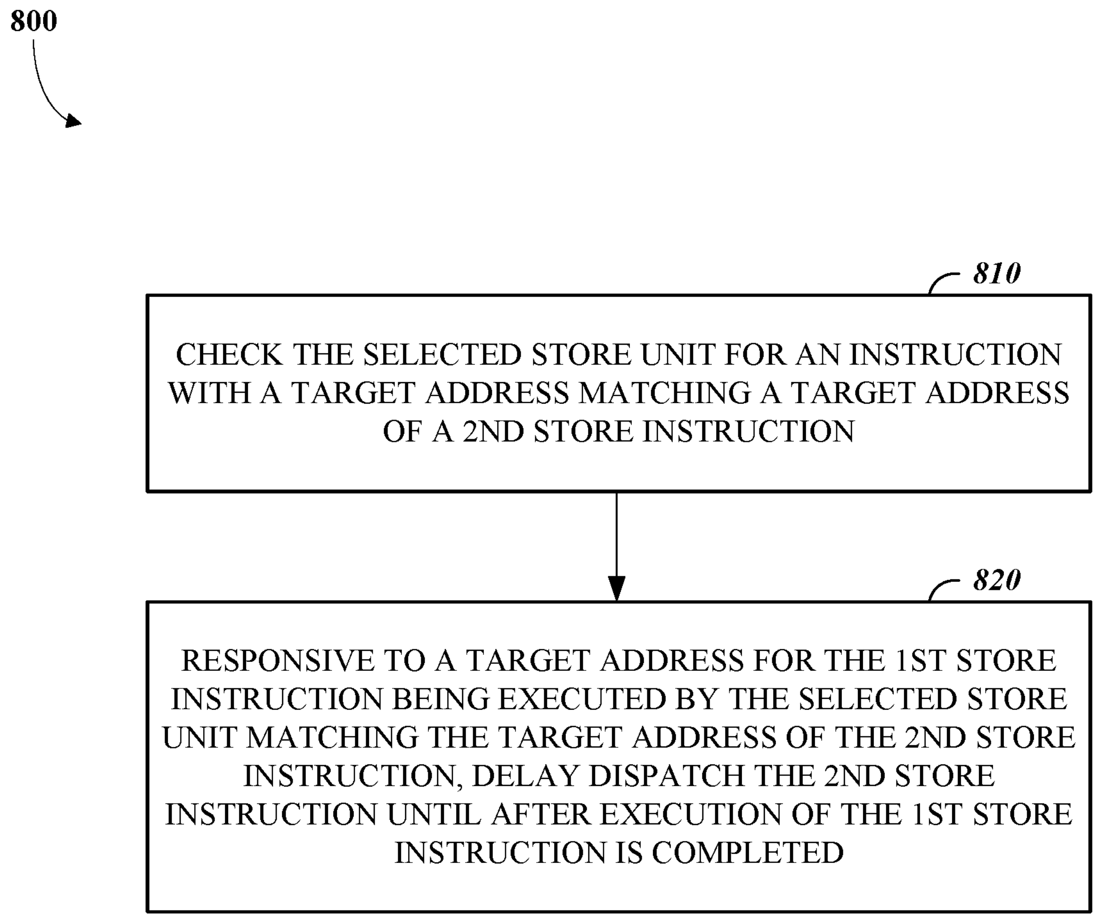
FIG. 8 is a flow chart of an example of a technique for delaying dispatch of an instruction based on a matching target address in a load-store pipeline.

Dependencies between instructions, which may include write after write (WAW) hazards or write after read (WAR) hazards, could impair performance of a system using two store units in parallel. A solution to prevent this problem is to detect dependencies and force a later write instruction to be dispatched to the same unit as the earlier instruction so that the later instruction is executed after the earlier instruction in a first-in-first-out (FIFO) queue. Another solution to prevent this problem is to detect dependencies and delay dispatch of the later write instruction until the earlier instruction finishes executing and then chose the execution unit for the later write instruction based on other criteria. FIGS. 7 and 8 describe two such solutions.

FIG. 7 is a flow chart of an example of a technique 700 for selecting a load-store pipeline based on a matching target address in a load-store pipeline. The technique 700 includes checking 710 the selected store unit for an instruction with a target address matching a target address of a second store instruction. For example, the second store instruction may be after the first store instruction in program order. The selected store unit may be checked 710 after the first store instruction has been dispatched, while it is still executing or waiting to be executed in the selected store unit. For example, the selected store unit (e.g., the first store unit 140 or the second store unit 142) may include a FIFO queue of instructions that it has been dispatched for execution. The technique 700 includes, responsive to a target address for the first store instruction being executed by the selected store unit matching the target address of the second store instruction, dispatching 720 the second store instruction to the selected store unit. Dispatching 720 the second store instruction to the selected store unit may serve to prevent the second store instruction from being executed before the first store instruction and thus avoid a write after write hazard. For example, the technique 700 may be implemented using the integrated circuit 110 of FIG. 1.

FIG. 8 is a flow chart of an example of a technique 800 for delaying dispatch of an instruction based on a matching target address in a load-store pipeline. The technique 800 includes checking 810 the selected store unit for an instruction with a target address matching a target address of a second store instruction. For example, the second store instruction may be after the first store instruction in program order. The selected store unit may be checked 810 after the first store instruction has been dispatched, while it is still executing or waiting to be executed in the selected store unit. For example, the selected store unit (e.g., the first store unit 140 or the second store unit 142) may include a FIFO queue of instructions that it has been dispatched for execution. The technique 800 includes, responsive to a target address for the first store instruction being executed by the selected store unit matching the target address of the second store instruction, delaying 820 dispatch of the second store instruction until after execution of the first store instruction is completed. Delaying 820 dispatch of the second store instruction to the selected store unit may serve to prevent the second store instruction from being executed before the first store instruction and thus avoid a write after write hazard, while allowing the second write instruction to be dispatched to a store unit that is preferred based on other considerations, such as whether an address associated with a first beat of the second write instruction matches a tag in the L1 cache or based on a prediction associated with the second write instruction. For example, the technique 800 may be implemented using the integrated circuit 110 of FIG. 1.

Figure 9:
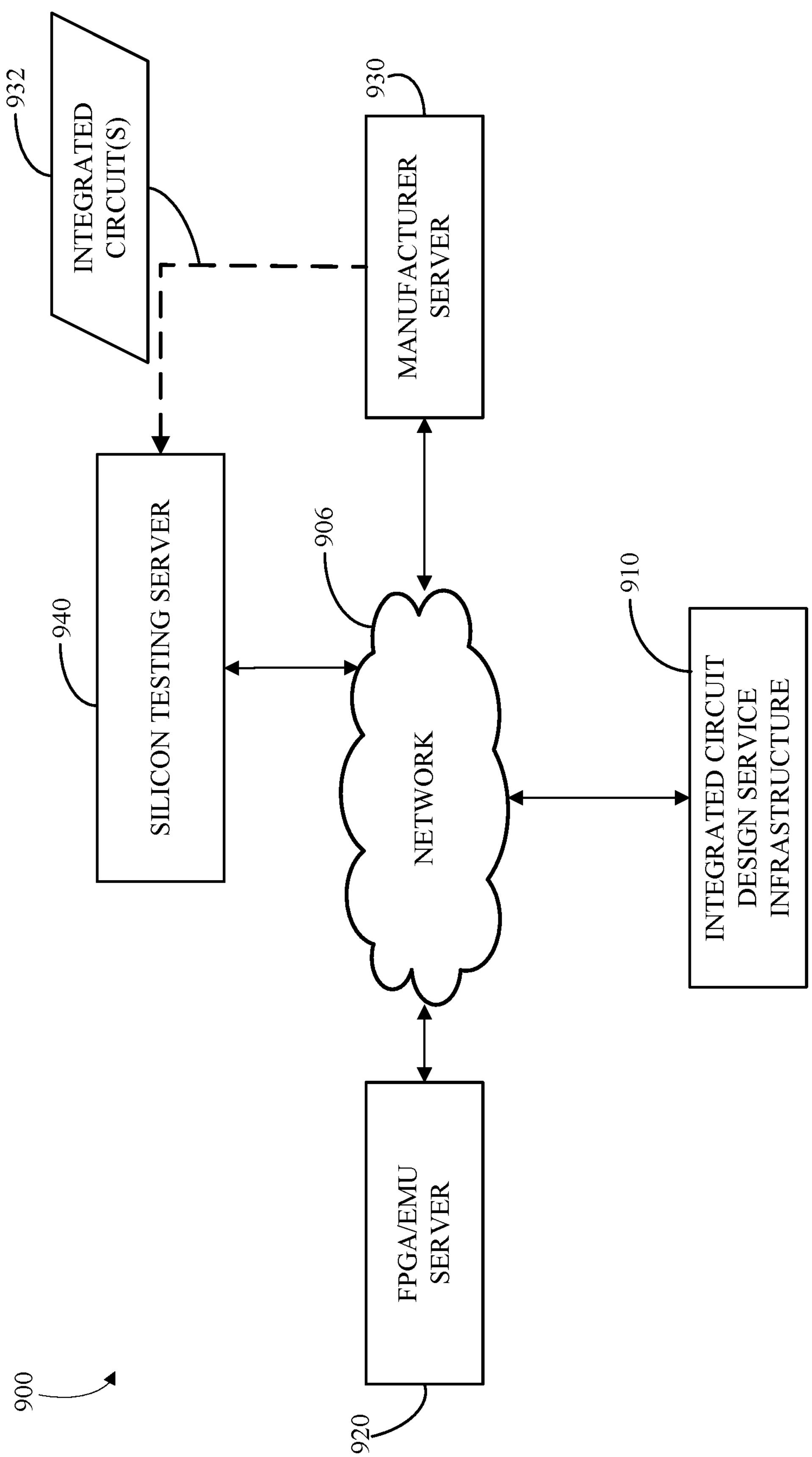
FIG. 9 is block diagram of an example of a system for facilitating generation and manufacture of integrated circuits.

FIG. 9 is block diagram of an example of a system 900 for generation and manufacture of integrated circuits. The system 900 includes a network 906, an integrated circuit design service infrastructure 910, a field programmable gate array (FPGA)/emulator server 920, and a manufacturer server 930. For example, a user may utilize a web client or a scripting API client to command the integrated circuit design service infrastructure 910 to automatically generate an integrated circuit design based a set of design parameter values selected by the user for one or more template integrated circuit designs. In some implementations, the integrated circuit design service infrastructure 910 may be configured to generate an integrated circuit design that includes the circuitry shown and described in FIG. 1 or 2.

The integrated circuit design service infrastructure 910 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 910 may invoke (e.g., via network communications over the network 906) testing of the resulting design that is performed by the FPGA/emulation server 920 that is running one or more FPGAs or other types of hardware or software emulators. For example, the integrated circuit design service infrastructure 910 may invoke a test using a field programmable gate array, programmed based on a field programmable gate array emulation data structure, to obtain an emulation result. The field programmable gate array may be operating on the FPGA/emulation server 920, which may be a cloud server. Test results may be returned by the FPGA/emulation server 920 to the integrated circuit design service infrastructure 910 and relayed in a useful format to the user (e.g., via a web client or a scripting API client).

The integrated circuit design service infrastructure 910 may also facilitate the manufacture of integrated circuits using the integrated circuit design in a manufacturing facility associated with the manufacturer server 930. In some implementations, a physical design specification (e.g., a graphic data system (GDS) file, such as a GDS II file) based on a physical design data structure for the integrated circuit is transmitted to the manufacturer server 930 to invoke manufacturing of the integrated circuit (e.g., using manufacturing equipment of the associated manufacturer). For example, the manufacturer server 930 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 910 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 910 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 930 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 932, update the integrated circuit design service infrastructure 910 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 910 on the status of the packaging and delivery process periodically or asynchronously. In some implementations, status updates may be relayed to the user when the user checks in using the web interface and/or the controller might email the user that updates are available.

In some implementations, the resulting integrated circuits 932 (e.g., physical chips) are delivered (e.g., via mail) to a silicon testing service provider associated with a silicon testing server 940. In some implementations, the resulting integrated circuits 932 (e.g., physical chips) are installed in a system controlled by silicon testing server 940 (e.g., a cloud server) making them quickly accessible to be run and tested remotely using network communications to control the operation of the integrated circuits 932. For example, a login to the silicon testing server 940 controlling a manufactured integrated circuits 932 may be sent to the integrated circuit design service infrastructure 910 and relayed to a user (e.g., via a web client). For example, the integrated circuit design service infrastructure 910 may control testing of one or more integrated circuits 932, which may be structured based on an RTL data structure.

Figure 10:
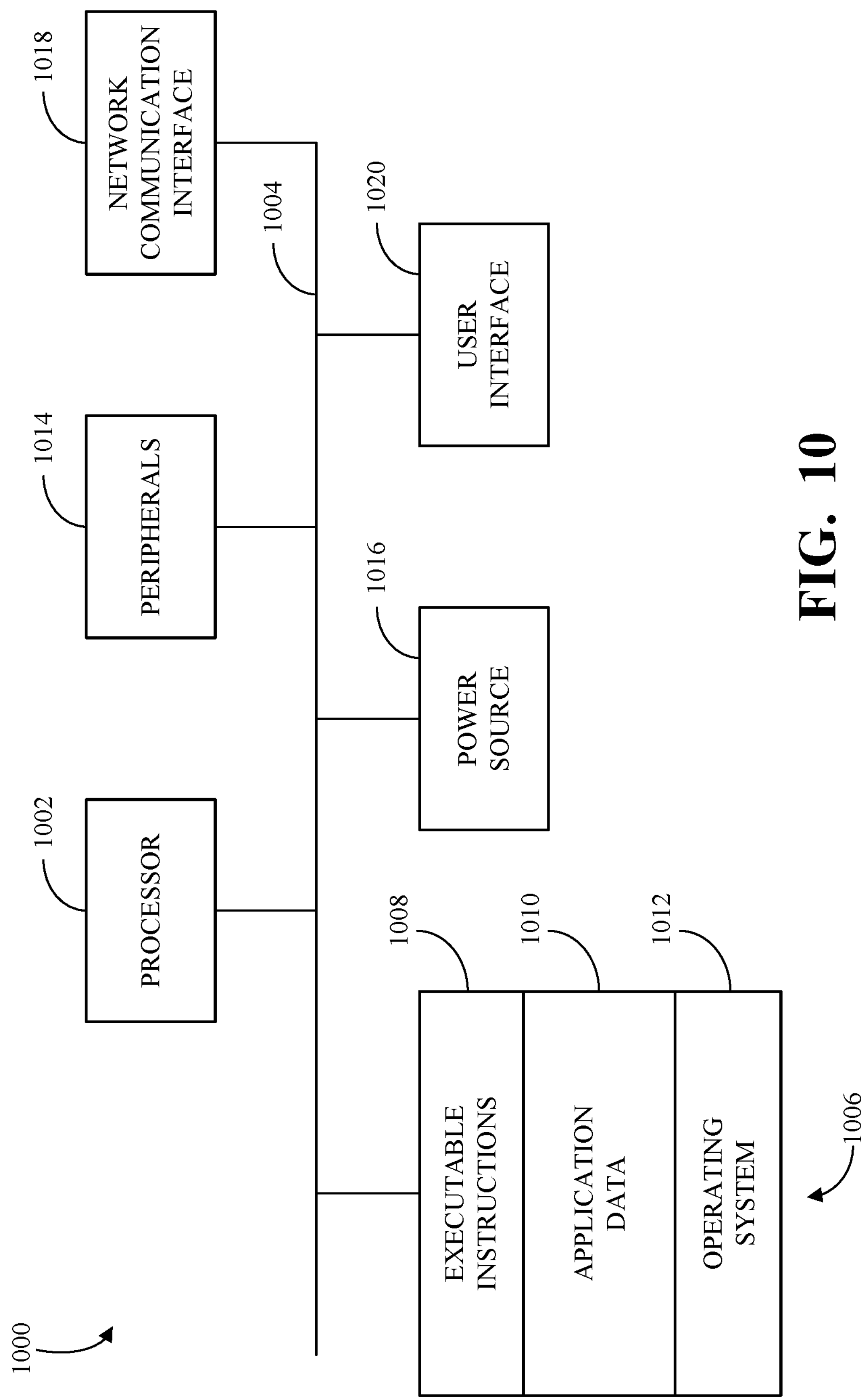
FIG. 10 is block diagram of an example of a system for facilitating generation of integrated circuits.

FIG. 10 is block diagram of an example of a system 1000 for facilitating generation of integrated circuits, for facilitating generation of a circuit representation for an integrated circuit, and/or for programming or manufacturing an integrated circuit. The system 1000 is an example of an internal configuration of a computing device. The system 1000 may be used to implement the integrated circuit design service infrastructure 910, and/or to generate a file that generates a circuit representation of an integrated circuit design including the circuitry shown and described in FIG. 1 or 2. The system 1000 can include components or units, such as a processor 1002, a bus 1004, a memory 1006, peripherals 1014, a power source 1016, a network communication interface 1018, a user interface 1020, other suitable components, or a combination thereof.

The processor 1002 can be a central processing unit (CPU), such as a microprocessor, and can include single or multiple processors having single or multiple processing cores. Alternatively, the processor 1002 can include another type of device, or multiple devices, now existing or hereafter developed, capable of manipulating or processing information. For example, the processor 1002 can include multiple processors interconnected in any manner, including hardwired or networked, including wirelessly networked. In some implementations, the operations of the processor 1002 can be distributed across multiple physical devices or units that can be coupled directly or across a local area or other suitable type of network. In some implementations, the processor 1002 can include a cache, or cache memory, for local storage of operating data or instructions.

The memory 1006 can include volatile memory, non-volatile memory, or a combination thereof. For example, the memory 1006 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 1006 can include another type of device, or multiple devices, now existing or hereafter developed, capable of storing data or instructions for processing by the processor 1002. The processor 1002 can access or manipulate data in the memory 1006 via the bus 1004. Although shown as a single block in FIG. 10, the memory 1006 can be implemented as multiple units. For example, a system 1000 can include volatile memory, such as RAM, and persistent memory, such as a hard drive or other storage.

The memory 1006 can include executable instructions 1008, data, such as application data 1010, an operating system 1012, or a combination thereof, for immediate access by the processor 1002. The executable instructions 1008 can include, for example, one or more application programs, which can be loaded or copied, in whole or in part, from non-volatile memory to volatile memory to be executed by the processor 1002. The executable instructions 1008 can be organized into programmable modules or algorithms, functional programs, codes, code segments, or combinations thereof to perform various functions described herein. For example, the executable instructions 1008 can include instructions executable by the processor 1002 to cause the system 1000 to automatically, in response to a command, generate an integrated circuit design and associated test results based on a design parameters data structure. The application data 1010 can include, for example, user files, database catalogs or dictionaries, configuration information or functional programs, such as a web browser, a web server, a database server, or a combination thereof. The operating system 1012 can be, for example, Microsoft Windows®, macOS®, or Linux®, an operating system for a small device, such as a smartphone or tablet device; or an operating system for a large device, such as a mainframe computer. The memory 1006 can comprise one or more devices and can utilize one or more types of storage, such as solid state or magnetic storage.

The peripherals 1014 can be coupled to the processor 1002 via the bus 1004. The peripherals 1014 can be sensors or detectors, or devices containing any number of sensors or detectors, which can monitor the system 1000 itself or the environment around the system 1000. For example, a system 1000 can contain a temperature sensor for measuring temperatures of components of the system 1000, such as the processor 1002. Other sensors or detectors can be used with the system 1000, as can be contemplated. In some implementations, the power source 1016 can be a battery, and the system 1000 can operate independently of an external power distribution system. Any of the components of the system 1000, such as the peripherals 1014 or the power source 1016, can communicate with the processor 1002 via the bus 1004.

The network communication interface 1018 can also be coupled to the processor 1002 via the bus 1004. In some implementations, the network communication interface 1018 can comprise one or more transceivers. The network communication interface 1018 can, for example, provide a connection or link to a network, such as the network 906 shown in FIG. 9, via a network interface, which can be a wired network interface, such as Ethernet, or a wireless network interface. For example, the system 1000 can communicate with other devices via the network communication interface 1018 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 1020 can include a display; a positional input device, such as a mouse, touchpad, touchscreen, or the like; a keyboard; or other suitable human or machine interface devices. The user interface 1020 can be coupled to the processor 1002 via the bus 1004. Other interface devices that permit a user to program or otherwise use the system 1000 can be provided in addition to or as an alternative to a display. In some implementations, the user interface 1020 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 1014. The operations of the processor 1002 can be distributed across multiple clients or servers, which can be coupled directly or across a local area or other suitable type of network. The memory 1006 can be distributed across multiple clients or servers, such as network-based memory or memory in multiple clients or servers performing the operations of clients or servers. Although depicted here as a single bus, the bus 1004 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in integrated circuit for executing instructions that includes a processor core configured to execute vector instructions that operate on vector arguments; an L1 cache that provides an interface to a memory system of the integrated circuit; an L2 cache connected to the L1 cache that implements a cache coherency protocol with the L1 cache; a first store unit configured to write data to the memory system via the L1 cache; a second store unit configured to bypass the L1 cache and write data to the memory system via the L2 cache; and a store pipeline selection circuitry configured to: identify an address associated with a first beat of a store instruction with a vector argument; select between the first store unit and the second store unit based on the address associated with the first beat of the store instruction; and dispatch the store instruction to the selected store unit.

In the first aspect, the store pipeline selection circuitry may be configured to search the L1 cache for a tag matching the address associated with the first beat of the store instruction; and, responsive to finding a matching tag in the L1 cache, select the first store unit. In the first aspect, the store pipeline selection circuitry may be configured to search the L1 cache for a tag matching the address associated with the first beat of the store instruction; and, responsive to not finding a matching tag in the L1 cache, select the second store unit. In the first aspect, the store instruction may be a first store instruction and the store pipeline selection circuitry may be configured to check the selected store unit for an instruction with a target address matching a target address of a second store instruction; and, responsive to a target address for the first store instruction being executed by the selected store unit matching the target address of the second store instruction, dispatch the second store instruction to the selected store unit. In the first aspect, the store instruction may be a first store instruction and the store pipeline selection circuitry may be configured to check the selected store unit for an instruction with a target address matching a target address of a second store instruction; and responsive to a target address for the first store instruction being executed by the selected store unit matching the target address of the second store instruction, delay dispatch of the second store instruction until after execution of the first store instruction is completed. In the first aspect, the first store unit may be a load/store pipeline and the second store unit may be a store-only pipeline. In the first aspect, the store pipeline selection circuitry may include a predictor and the store pipeline selection circuitry may be configured to input the address associated with the first beat of the store instruction and a program counter value to the predictor to obtain a prediction indicating whether the first store unit or the second store unit should be used for the store instruction; and select between the first store unit and the second store unit based on the prediction. For example, the predictor may store entries that are indexed by a hash of a program counter value and a target address. In some implementations, an entry of the predictor may be updated based on a cache invalidation event of the cache coherency protocol that invalidates an entry of the L1 cache responsive to execution of an instruction by the second store unit. For example, an entry of the predictor may store a counter that is updated when the store instruction is retired. In the first aspect, the store pipeline selection circuitry may be configured to check whether the address associated with the first beat of the store instruction corresponds to memory mapped input/output; and, responsive to determining the address associated with the first beat of the store instruction corresponds to memory mapped input/output, select the first store unit.

In a second aspect, the subject matter described in this specification can be embodied in methods that include identifying an address associated with a first beat of a store instruction with a vector argument; selecting between a first store unit and a second store unit based on the address associated with the first beat of the store instruction, wherein the first store unit interfaces to a memory system through an L1 cache and the second store unit bypasses the L1 cache when accessing the memory system; and dispatching the store instruction to the selected store unit.

In the second aspect, the methods may include searching the L1 cache for a tag matching the address associated with the first beat of the store instruction; and, responsive to finding a matching tag in the L1 cache, selecting the first store unit. In the second aspect, the methods may include searching the L1 cache for a tag matching the address associated with the first beat of the store instruction; and, responsive to not finding a matching tag in the L1 cache, selecting the second store unit. In the second aspect, the store instruction may be a first store instruction and the methods may include checking the selected store unit for an instruction with a target address matching a target address of a second store instruction; and, responsive to a target address for the first store instruction being executed by the selected store unit matching the target address of the second store instruction, dispatching the second store instruction to the selected store unit. In the second aspect, the store instruction may be a first store instruction and the methods may include checking the selected store unit for an instruction with a target address matching a target address of a second store instruction; and, responsive to a target address for the first store instruction being executed by the selected store unit matching the target address of the second store instruction, delaying dispatch of the second store instruction until after execution of the first store instruction is completed. In the second aspect, the first store unit may be a load/store pipeline and the second store unit may be a store-only pipeline. In the second aspect, the methods may include inputting the address associated with the first beat of the store instruction and a program counter value to a predictor to obtain a prediction indicating whether the first store unit or the second store unit should be used for the store instruction; and selecting between the first store unit and the second store unit based on the prediction. For example, the predictor may store entries that are indexed by a hash of a program counter value and a target address. In some implementations, an entry of the predictor is updated based on a cache invalidation event of a cache coherency protocol that invalidates an entry of the L1 cache responsive to execution of an instruction by the second store unit. In some implementations, an entry of the predictor stores a counter that is updated when the store instruction is retired. In the second aspect, the methods may include checking whether the address associated with the first beat of the store instruction corresponds to memory mapped input/output; and, responsive to determining the address associated with the first beat of the store instruction corresponds to memory mapped input/output, selecting the first store unit.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
- a processor core configured to execute vector instructions that operate on vector arguments;
- an L1 cache that provides an interface to a memory system of the integrated circuit;
- an L2 cache connected to the L1 cache that implements a cache coherency protocol with the L1 cache;
- a first store unit configured to write data to the memory system via the L1 cache;
- a second store unit configured to bypass the L1 cache and write data to the memory system via the L2 cache; and
- a store pipeline selection circuitry configured to:
  - identify an address associated with a first beat of a store instruction with a vector argument;
  - select between the first store unit and the second store unit based on the address associated with the first beat of the store instruction; and
  - dispatch the store instruction to the selected store unit.

2. The integrated circuit of claim 1, in which the store pipeline selection circuitry is configured to:
- search the L1 cache for a tag matching the address associated with the first beat of the store instruction; and
- responsive to finding a matching tag in the L1 cache, select the first store unit.

3. The integrated circuit of claim 1, in which the store pipeline selection circuitry is configured to:
- search the L1 cache for a tag matching the address associated with the first beat of the store instruction; and
- responsive to not finding a matching tag in the L1 cache, select the second store unit.

4. The integrated circuit of claim 1, in which the store instruction is a first store instruction and store pipeline selection circuitry is configured to:
- check the selected store unit for an instruction with a target address matching a target address of a second store instruction; and
- responsive to a target address for the first store instruction being executed by the selected store unit matching the target address of the second store instruction, dispatch the second store instruction to the selected store unit.

5. The integrated circuit of claim 1, in which the store instruction is a first store instruction and store pipeline selection circuitry is configured to:
- check the selected store unit for an instruction with a target address matching a target address of a second store instruction; and
- responsive to a target address for the first store instruction being executed by the selected store unit matching the target address of the second store instruction, delay dispatch of the second store instruction until after execution of the first store instruction is completed.

6. The integrated circuit of claim 1, in which the first store unit is a load/store pipeline and the second store unit is a store-only pipeline.

7. The integrated circuit of claim 1, in which the store pipeline selection circuitry includes a predictor and the store pipeline selection circuitry is configured to:
- input the address associated with the first beat of the store instruction and a program counter value to the predictor to obtain a prediction indicating whether the first store unit or the second store unit should be used for the store instruction; and
- select between the first store unit and the second store unit based on the prediction.

8. The integrated circuit of claim 7, in which the predictor stores entries that are indexed by a hash of a program counter value and a target address.

9. The integrated circuit of claim 7, in which an entry of the predictor is updated based on a cache invalidation event of the cache coherency protocol that invalidates an entry of the L1 cache responsive to execution of an instruction by the second store unit.

10. The integrated circuit of claim 7, in which an entry of the predictor stores a counter that is updated when the store instruction is retired.

11. The integrated circuit of claim 1, in which the store pipeline selection circuitry is configured to:

check whether the address associated with the first beat of the store instruction corresponds to memory mapped input/output; and responsive to determining the address associated with the first beat of the store instruction corresponds to memory mapped input/output, select the first store unit.

12. A method comprising:

identifying an address associated with a first beat of a store instruction with a vector argument;

selecting between a first store unit and a second store unit based on the address associated with the first beat of the store instruction, wherein the first store unit interfaces to a memory system through an L1 cache and the second store unit bypasses the L1 cache when accessing the memory system; and dispatching the store instruction to the selected store unit.

13. The method of claim 12, comprising:

searching the L1 cache for a tag matching the address associated with the first beat of the store instruction; and responsive to finding a matching tag in the L1 cache, selecting the first store unit.

14. The method of claim 12, comprising:

searching the L1 cache for a tag matching the address associated with the first beat of the store instruction; and responsive to not finding a matching tag in the L1 cache, selecting the second store unit.

15. The method of claim 12, in which the store instruction is a first store instruction, comprising:

checking the selected store unit for an instruction with a target address matching a target address of a second store instruction; and responsive to a target address for the first store instruction being executed by the selected store unit matching the target address of the second store instruction, dispatching the second store instruction to the selected store unit.

16. The method of claim 12, in which the store instruction is a first store instruction, comprising:

checking the selected store unit for an instruction with a target address matching a target address of a second store instruction; and responsive to a target address for the first store instruction being executed by the selected store unit matching the target address of the second store instruction, delaying dispatch of the second store instruction until after execution of the first store instruction is completed.

17. The method of claim 12, in which the first store unit is a load/store pipeline and the second store unit is a store-only pipeline.

18. The method of claim 12, comprising:

inputting the address associated with the first beat of the store instruction and a program counter value to a predictor to obtain a prediction indicating whether the first store unit or the second store unit should be used for the store instruction; and selecting between the first store unit and the second store unit based on the prediction.

19. The method of claim 18, in which the predictor stores entries that are indexed by a hash of a program counter value and a target address.

20. The method of claim 18, in which an entry of the predictor is updated based on a cache invalidation event of a cache coherency protocol that invalidates an entry of the L1 cache responsive to execution of an instruction by the second store unit.

21. The method of claim 18, in which an entry of the predictor stores a counter that is updated when the store instruction is retired.

22. The method of claim 12, comprising:

checking whether the address associated with the first beat of the store instruction corresponds to memory mapped input/output; and responsive to determining the address associated with the first beat of the store instruction corresponds to memory mapped input/output, selecting the first store unit.

* * * * *